United States Patent
Cyrusian

(10) Patent No.: US 6,519,103 B2
(45) Date of Patent: Feb. 11, 2003

(54) VIEW DAC FEEDBACK INSIDE ANALOG FRONT CIRCUIT

(75) Inventor: Sasan Cyrusian, Scotts Valley, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/865,757

(22) Filed: May 25, 2001

(65) Prior Publication Data

US 2002/0176190 A1 Nov. 28, 2002

(51) Int. Cl.$^7$ .................. G11B 5/09; G11B 27/36; G11B 5/02
(52) U.S. Cl. .................. 360/46; 360/31; 360/67; 360/25
(58) Field of Search ................. 360/46, 67, 68, 360/25, 31

(56) References Cited

U.S. PATENT DOCUMENTS

| | | | | |
|---|---|---|---|---|
| 5,301,072 A | * | 4/1994 | Wilson | 360/77.01 |
| 5,585,974 A | | 12/1996 | Shrinkle | |
| 5,734,680 A | | 3/1998 | Moore et al. | |
| 5,754,353 A | | 5/1998 | Behrens et al. | |
| 5,991,107 A | * | 11/1999 | Behrens et al. | 360/46 |
| 6,141,169 A | * | 10/2000 | Pietruszynski et al. | 360/67 |
| 6,215,433 B1 | * | 4/2001 | Sonu et al. | 341/155 |
| 6,369,661 B1 | * | 4/2002 | Scott et al. | 331/179 |

OTHER PUBLICATIONS

"Synchronous Recording Channels—PRML & Beyond", rev. 5.61 14.E.18, 1999, published by Knowledge Tek, Inc., Broomfield, Colorado.

"PRML: Seagate Uses Space Age Technology" available on the Internet at http://www.seagate.com/support/kb/disc/prml.html, 2 pages, last accessed Apr. 9, 2001.

"Technologies—PRML" available on the Internet at http://www.idema.org/about/industry/ind_tech_prml.html, 1 page, last accessed Apr. 9, 2001.

"References Guide—Hard Disk Drives" available on the Internet at http://www.storagereview.com/guide2000/ref/hdd, 13 pages, last accessed Apr. 9, 2001.

"MR and PRML: Technologies in Synergy" available at on the Internet at http://www.lionsgate.com/Home/Baden/public_html_index/SCSI/Quantum_White_Papers/MR_Head/MR, 4 pages, last accessed Apr. 9, 2001.

"A Tutorial on Convolutional Coding with Viterbi Decoding" available on the Internet at http://pw1.netcom.com/~chip.f/viterbi/tutorial.html, 10 pages, last accessed Apr. 9, 2001.

* cited by examiner

Primary Examiner—Regina N. Holder
(74) Attorney, Agent, or Firm—Brinks Hofer Gilson & Lione

(57) ABSTRACT

A view DAC feedback inside an analog front circuit for a partial response, maximum likelihood based read/write channel is disclosed. The view DAC feedback circuit may be configured to apply an analog signal associated with an operation level of the PRML based read/write channel to the analog front circuit of the read channel. The view DAC analog signal may be used to calibrate operating parameters for a continuous time filter component of the analog front circuit. The view DAC feedback circuit may be configured to add digitally-controlled noise to the PRMIL read/write channel to optimize performance of the channel in a low signal-to-noise (SNR) environment.

23 Claims, 8 Drawing Sheets

VIEW DAC FEEDBACK INSIDE ANALOG FRONT CIRCUIT

BACKGROUND

Computer hard disk drives, also known as fixed disk drives or hard disk drives, have become a de facto data storage standard for computer systems. Their proliferation can be directly attributed to their low cost, high storage capacity and reliability, in addition to wide availability, low power consumption, fast data transfer speeds and decreasing physical size.

Disk drives typically include one or more rotating magnetic platters encased within an environmentally controlled housing. The hard drive may have several read/write heads that interface with the magnetic platters. The disk drive may further include electronics for reading and writing data and for interfacing with other devices. The electronics are coupled with the read/write heads and include circuits to control head positioning and to generate or sense electromagnetic fields on the platters. The electronics encode data received from a host device, such as a personal computer, and translate the data into magnetic encodings, which are written onto the platters. When data is requested, the electronics locate the data, sense the magnetic encodings, and translate the encodings into binary digital information. Error checking and correction may also be applied to ensure accurate storage and retrieval of data.

The read/write heads detect and record the encoded data as areas of magnetic flux. The data are encoded by the presence or absence of a flux reversal between two contiguous areas of the platter. Data may be read using a method known as "Peak Detection" by which a voltage peak imparted in the read/write head is detected when a flux reversal passes the read/write head. However, increasing storage densities, requiring reduced peak amplitudes, better signal discrimination and higher platter rotational speeds are pushing the peaks in closer proximity. Thus, peak detection methods are becoming increasingly complex.

Advancements in read/write heads and in the methods of interpreting magnetic encodings have been made. For example, magneto-resistive ("MR") read/write heads have been designed with increased sensitivity and increased signal discrimination. In addition, technology known as Partial Response Maximum Likelihood ("PRML") has been developed. PRML disk drives function based an algorithm implemented in the disk drive electronics to read analog waveforms generated by the magnetic flux reversals. Instead of looking for peak values, PRML based drives digitally sample the analog waveform (the "Partial Response") and carry out advanced signal processing techniques to determine a most-likely bit pattern represented by the wave form (the "Maximum Likelihood"). PRML technology tolerates more noise in the magnetic signals, permitting use of lower quality platters and read/write heads, which also increases manufacturing yields and lowers costs.

With hard drives typically differentiated by factors such as cost/unit of storage, data transfer rate, power requirement, and form factor (physical dimensions), there is a need for enhanced hard drive components which prove cost effective in optimizing storage capacity, operating speed, reliability and power efficiency. An example of an area includes PRML electronics used to calibrate and tune the PRML read/write channel. These electronics may include a view DAC circuit used to determine a performance level of the operation of the PRML based read/write channel. The view DAC provides an analog output signal converted from an internal clock signal and data at an internal 7-bit digital port. The analog signal is used in conjunction with external hardware and software devices to determine the level of operation for the PRML electronics. When the PRML read/write channel is operating at a level that is less than optimal, the external hardware and software devices are used to tune the circuit to an optimal level using information provided with the view DAC output signal. Several component of the PRML read/write channel are calibrated during the tuning operation. The tuning/calibration operation may be time-consuming, labor-intensive and thereby add to the cost of the PRML read/write channel.

Accordingly, there is a need in the art for a View DAC Feedback inside of an analog front for a PRML read/write channel.

SUMMARY

A view DAC feedback inside of an analog front circuit for a partial response, maximum likelihood ("PRML") read/write channel is disclosed. The view DAC circuit derives an analog signal associated with a performance level for various electronic components of the PRML based read write channel. The analog signal is derived from a 7-bit digital port and a clock signal. The analog signal may be provided to external hardware and used for diagnostic purposes.

An embodiment for a view DAC feedback includes a PRML based read/write channel having a read circuit including an analog front circuit, a view DAC circuit, and a view DAC feedback circuit. The analog front circuit may include multiple electronic components configured to process analog information that is received from a magnetic data storage medium. The analog information may be converted to a digital signal and further processed by a digital circuit configured to carry out digital signal processing techniques.

The view DAC circuit may be configured to convert digital signals to an analog signal associated with the digital signals. The analog signal is provided at a view DAC output node. The view DAC circuit has an input coupled with an internal PRML digital port having high-speed digital signals and a clock input coupled with an internal clock generator. In an embodiment, an auxiliary multiplexer is coupled with the clock input and configured to selectively couple one of multiple internal clock generators with the view DAC circuit.

The view DAC feedback circuit is coupled with the view DAC output node. The view DAC feedback is configured to selectively couple the view DAC output to the analog front circuit during a calibration procedure. The analog signal provided at the view DAC output may be used for diagnostics for the performance of the PRML read/write channel. In an embodiment, the view DAC feedback circuit couples the view DAC output with the analog front circuit to optimize performance for the PRML read/write channel.

An embodiment of a method of tuning a read circuit of a PRML based read/write channel, the method comprising the acts of: generating an analog signal associated with a performance level of the PRML based read channel, the analog signal being generated from digital information from an internal digital bus; and selectively coupling the analog signal to an analog front circuit for a read component of the PRML read/write channel. The view DAC feed back provides a circuit that uses existing PRML analog front circuit to calibrate the PRML read/write channel.

In an embodiment, the act of generating an analog signal may further include selecting a digital clock signal from a servo clock signal and a read/write clock signal. The selected digital clock signal and a 7-bit digital data signal received from an internal digital port for the PRML read/write channel are converted to the analog associated with a performance level of the PRML based read/write channel. The analog signal is provided to the analog front circuit, optimizing performance of components of the PRML based read/write channel.

The foregoing discussion of the summary of the invention is provided only by way of introduction. Nothing in this section should be taken as a limitation on the claims, which define the scope of the invention. Additional objects and advantages of the present invention will be set forth in the description that follows, and in part will be obvious from the description, or may be learned by practice of the present invention. The objects and advantages of the present invention may be realized and obtained by means of the instrumentalities and combinations particularly pointed out in the claims.

DETAILED DESCRIPTION

The embodiments described herein relate to a partial response, maximum likelihood ("PRML") based read/write channel. The PRML read/write channel is coupled with the read/write heads of the hard drive. Herein, the phrase "coupled with" is defined to mean directly connected to or indirectly connected through one or more intermediate components. Such intermediate components may include both hardware and software based components. The read/write channel converts digital data from the host device into electrical impulses to control the read/write head to magnetically record data to the hard disk. During read operations, the read/write channel receives an analog waveform magnetically sensed by the read/write heads and converts that waveform into the digital data stored on the drive.

The illustrated embodiments provide a view DAC feedback inside an analog front circuit for a PRML based read/write channel. The view DAC feedback provides for optimization of the performance of a PRML read/write channel by providing an analog signal to an analog front circuit. The analog signal is is associated with a performance level of the PRML read/write channel.

The view DAC signal is processed by the analog front in a feedback circuit during a calibration operation for the PRML circuit to optimize performance of the PRML read/write channel. The view DAC signal may be coupled singly or in combination with other analog signals provided to the analog front circuit.

The view DAC feedback provides for calibration of an analog front circuit by providing a signal associated with a performance level of the PRML read/write channel. By way of example, the view DAC feedback circuit may be configured to provide gain calibration for the analog front circuit, calibration of cut-off frequency for a continuous time filter, and boost off frequency for a continuous time filter. The view DAC feedback may be configured to calibrate electronic components that make up the analog front circuit. The view DAC feedback may be further configured to provide digitally-controlled noise to an input of the PRML read/write channel. When the digitally-controlled noise is provided at the input, the PRML read/write channel can be optimized to operate in a low signal-to-noise ratio (SNR) environment.

Figure 1:
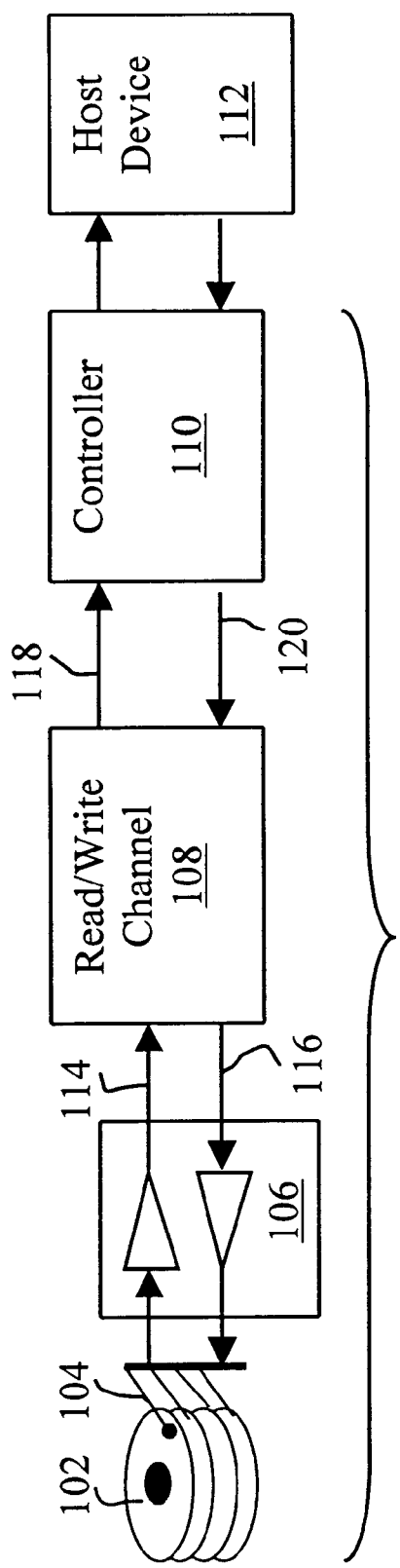
FIG. 1 depicts a block diagram of an exemplary hard drive coupled with a host device.

The present embodiments will be explained with reference to accompanied FIGS. 1 through 8. Referring now to FIG. 1, a block diagram for a hard drive 100 coupled with a host device 112 is shown. For clarity, some components, such as a servo/actuator motor control, are not shown. The drive 100 includes the magnetic surfaces and spindle motor 102, the read/write heads and actuator assembly 104, pre-amplifiers 106, a read/write channel 108 and a controller 110. The pre-amplifiers 106 are coupled with the read/write channel 108 via interfaces 114 and 116. The controller 110 interfaces with the read/write channel 108 via interfaces 118 and 120.

For reads from the hard disk 100, the host device 112 provides a location identifier that identifies the location of the data on the disk drive, e.g. a cylinder and sector address. The controller 110 receives this address and determines the physical location of the data on the platters 102. The controller 110 then moves the read/write heads into the proper position for the data to spin underneath the read/write heads 104. As the data spins underneath the read/write head 104, the read/write head 104 senses the presence or absence of flux reversals, generating a stream of analog signal data. This data is passed to the pre-amplifiers 106 which amplify the signal and pass the data to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write the data. The controller 110 moves the read/write heads 104 to a designated location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The signals are passed to the pre-amplifiers 106 via interface 116 which drive the read/write heads 104.

Figure 2:
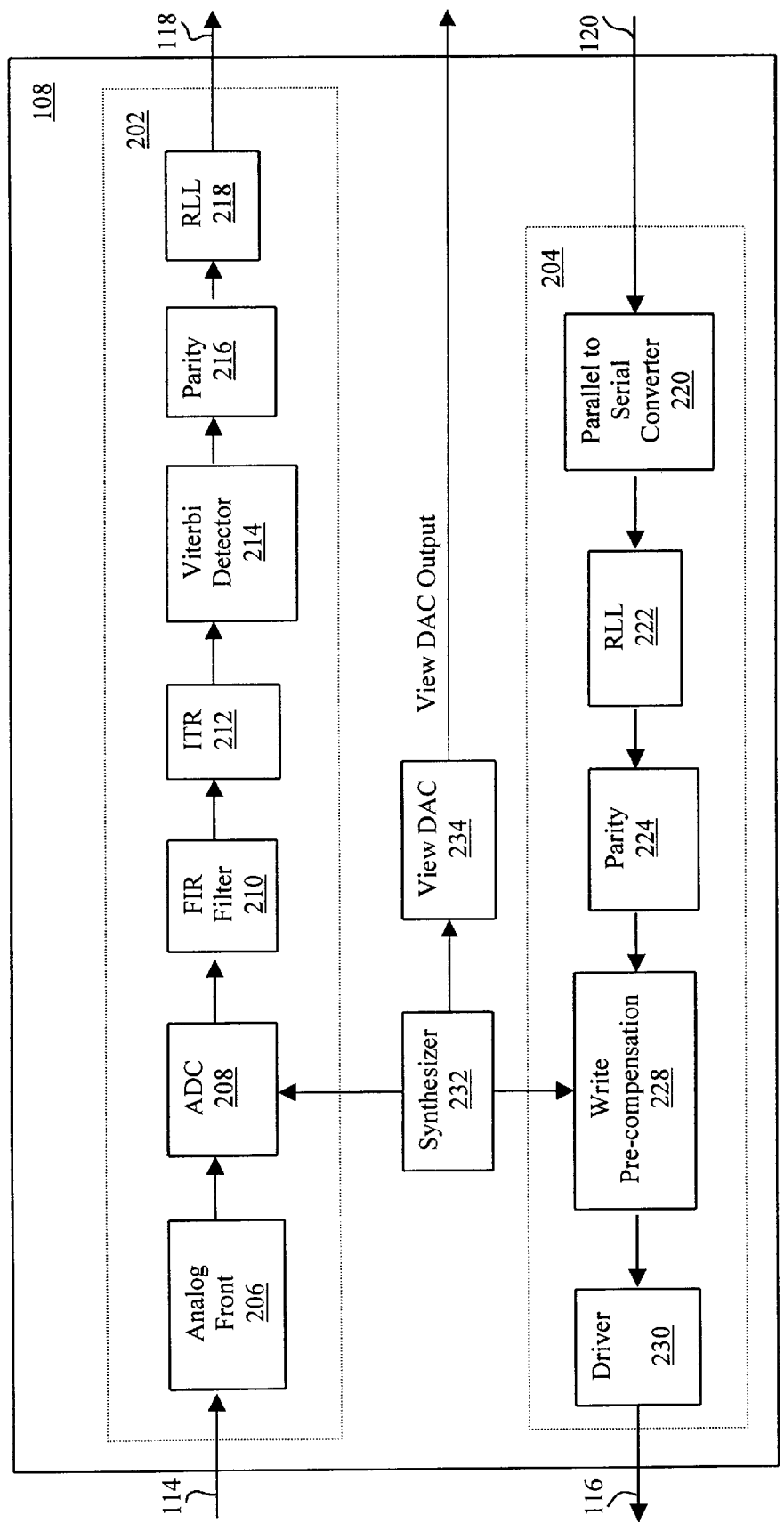
FIG 2 depicts a block diagram of read/write channel for use with a hard drive.

Referring to FIG. 2, an exemplary read/write channel 108 is shown that supports Partial Response, Maximum Likelihood ("PRML") encoding technology for use with the hard drive 100 of FIG. 1. For clarity, some components have been omitted. The read/write channel 108 may be implemented as an integrated circuit using a complementary metal oxide semiconductor ("CMOS") process for transistors having an effective channel length of 0.18 micron. It will be appreciated that other process technologies and feature sizes may be used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read path 202 and the write path 204.

The write path 204 includes a parallel-to-serial converter 220, a run-length-limited ("RLL") encoder 222, a parity encoder 224, a write pre-compensation circuit 228 and a driver circuit 230. The parallel to serial converter 220 receives data from the host device 112 via the interface 120 eight bits at a time. The converter 220 serializes the input data and sends a serial bit stream to the RLL encoder 222. The RLL encoder 222 encodes the serial bit stream into symbolic binary sequences according to a run-length limited algorithm for recording on the platters 102. The exemplary RLL encoder may use a 32/33 bit symbol code to ensure that flux reversals are properly spaced and that long runs of data without flux reversals are not recorded. The RLL encoded data is then passed to the parity encoder 224 that adds a parity bit to the data. In the exemplary parity encoder 224, odd parity is used to ensure that long runs of 0's and 1's are not recorded due to the magnetic properties of such recorded data. The signal is passed to a write pre-compensation circuit 228 that dynamically adjusts the pulse widths of the bit stream to account for magnetic distortions in the recording process. The adjusted signal is passed to a driver circuit 230 that drives the signal to the pre-amplifiers 106 via interface 116. The pre-amplifiers 106 drive the read/write heads 104 to record the data. The exemplary driver circuit 230 may include a pseudo emitter coupled logic ("PECL") driver circuit that generates a differential output to the pre-amplifiers 106.

The read path 202 includes an analog front circuit 206, an analog to digital converter ("ADC") 208, a finite impulse response ("FIR") filter 210, an interpolated timing recovery ("ITR") circuit 212, a Viterbi algorithm detector 214, a parity decoder 216, and a run-length-limited ("RLL") decoder 218. The amplified magnetic signals sensed from the platters 102 by the read/write head 104 are received by the read/write channel 108 via interface 114. The analog waveform representing the sensed magnetic signals is first passed to the analog front circuit 206. The analog front circuit 206, described in detail below, cleans the analog signal for conversion to a digital signal. The cleaned analog signal is then passed to the ADC 208 that samples the analog signal and converts it to a digital signal.

The digital signal is then passed to a FIR filter 210 and then to a timing recovery circuit 212. The exemplary FIR filter 210 may be a ten-tap FIR filter. The digital signal is then passed to the Viterbi algorithm detector 214 that determines the binary bit pattern represented by the digital signal using digital signal processing techniques. The exemplary Viterbi algorithm detector 214 uses a 32 state Viterbi processor. The binary data represented by the digital signal is then passed to the parity decoder 216, which removes the parity bit, and then to the RLL decoder 218. The RLL decoder 218 decodes the binary RLL encoding symbols to the actual binary data. This data is then passed to the controller 110 via the interface 118. The timing recovery circuit 212 may be coupled (not shown in the figure) with the analog front circuit in a feedback orientation to adjust the analog front circuit to provide timing compensation.

The read/write channel 108 further may include a view DAC 234 and a clock synthesizer 232. The clock synthesizer 232 provides clock signals to the read channel 224 and the write channel 204 to synchronize read and write operations. The clock synthesizer 232 may include a phase locked loop ("PLL") (not shown). The view DAC 234 is an internal digital-to-analog circuit configured to monitor internal digital signals internal to the read/write channel. The view DAC 234 provides an analog signal associated with a performance level for operation of digital circuits of the PRML read/write channel 202. The analog signal is provided external to the PRML read/write channel. The analog signal may be processed with external hardware and software devices. The external hardware and software device may process the analog signal to perform monitoring and diagnostics of the operation of the PRML read/write channel.

Figure 3:
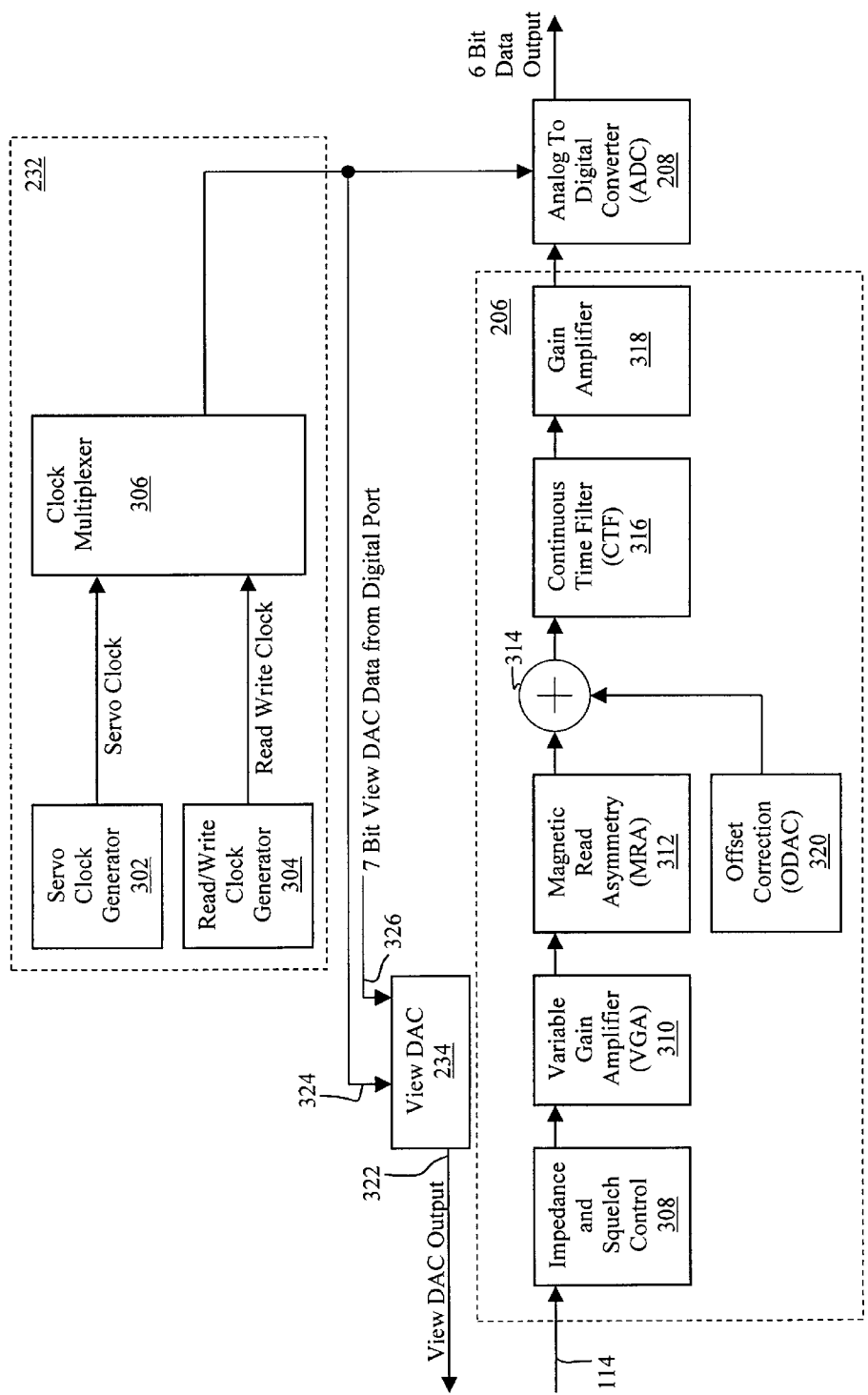
FIG. 3 is a block diagram of an exemplary circuit including an analog front circuit, a synthesizer and a view DAC circuit.

Referring now to FIG. 3, an embodiment for a circuit including an analog front circuit 206, a portion of a clock synthesizer 232, and a view DAC 234 of FIG. 2 is shown. The analog front circuit includes an impedance and squelch control circuit 308 circuit, a variable gain amplifier ("VGA") 310, a magneto-resistive asymmetry linearizer ("MRA") 312, a continuous time filter ("CTF") 316, a gain amplifier 318. The analog front circuit may further include an offset correction circuit 320 and a summing node 314.

The magnetic signals sensed by the read/write head 104 are passed to the analog front circuit via interface 114. The magnetic signals are received at the impedance and squelch control circuit 308. The impedance and squelch control circuit 308 is a switching circuit that attenuates the signal to account for any input resistance. The impedance and squelch control circuit 308 may be programmable to provide a programmed attenuation at a desired input impedance. The attenuated signal is then passed to the VGA 310 that amplifies the signal. The amplified signal is then passed to the MRA 312 that adjusts the signal for any distortion created by the recording process.

The signal is then passed to a summing node 314 where it is combined with an output of an offset correction circuit ("ODAC") 320. The ODAC 320 corrects the analog signal to compensate for an offset in the analog signal path due to processing from the components of the analog front circuit 206 and the ADC circuit 208. The offset is cancelled by the ODAC circuit 320 at the summing node 314 and passed to the CTF 316. The CTF 316 is configured to filter out noise present in the analog signal and pre-equalize the analog signal. The CTF may be configured to boost components of the signal. The CTF 316 may be a low pass filter or other device capable of filtering noise from an analog signal. The filtered signal is then passed to the ADC 208 via the gain amplifier 318.

The clock synthesizer 232 is configured to provide a digital clock signal to the ADC 208. The digital clock signal is used to synchronize timing of read operations. The clock synthesizer 232 may include a servo clock generator 302, a read/write clock generator 304, and a clock multiplexer 306. The servo clock generator 302 provides a servo clock signal to synchronize head positioning with read operations. The read/write clock generator 304 provides a high-speed read/write clock signal that is used to synchronize data sampling during read operations and to generate write data. The clock mulitplexer 306 couples the servo clock signal or the read/write clock signal to the ADC 208 in response to external control signals provided by a controller (not shown).

The view DAC 234 has a clock input 324 a data input 326, and a view DAC output 322. The view DAC 234 receives a clock signal from the clock multiplexer 306 at the clock input 324 and receives a 7-bit view DAC signal from an internal digital port for the read channel at the data input 326. The 7-bit view DAC signal includes high-speed digital output signals detected from other internal digital components fo the PRML read/write channel. The signals are selected by a processor external to the PRML read/write channel.

The view DAC 234 generates an analog signal that is provided at the view DAC output 232. The analog signal is based on the 7-bit view DAC signal and the clock signal and is associated with a performance level for the PRML read/write channel. The view DAC 234 may include an 8-bit digital-to-analog converter circuit to configured to convert the clock signal from the clock multiplexer 306 and the high-speed 7-bit view DAC signal. The view DAC analog signal may also be used in conjunction with other external hardware and software for diagnostics and calibration of the read/write channel.

Figure 4:
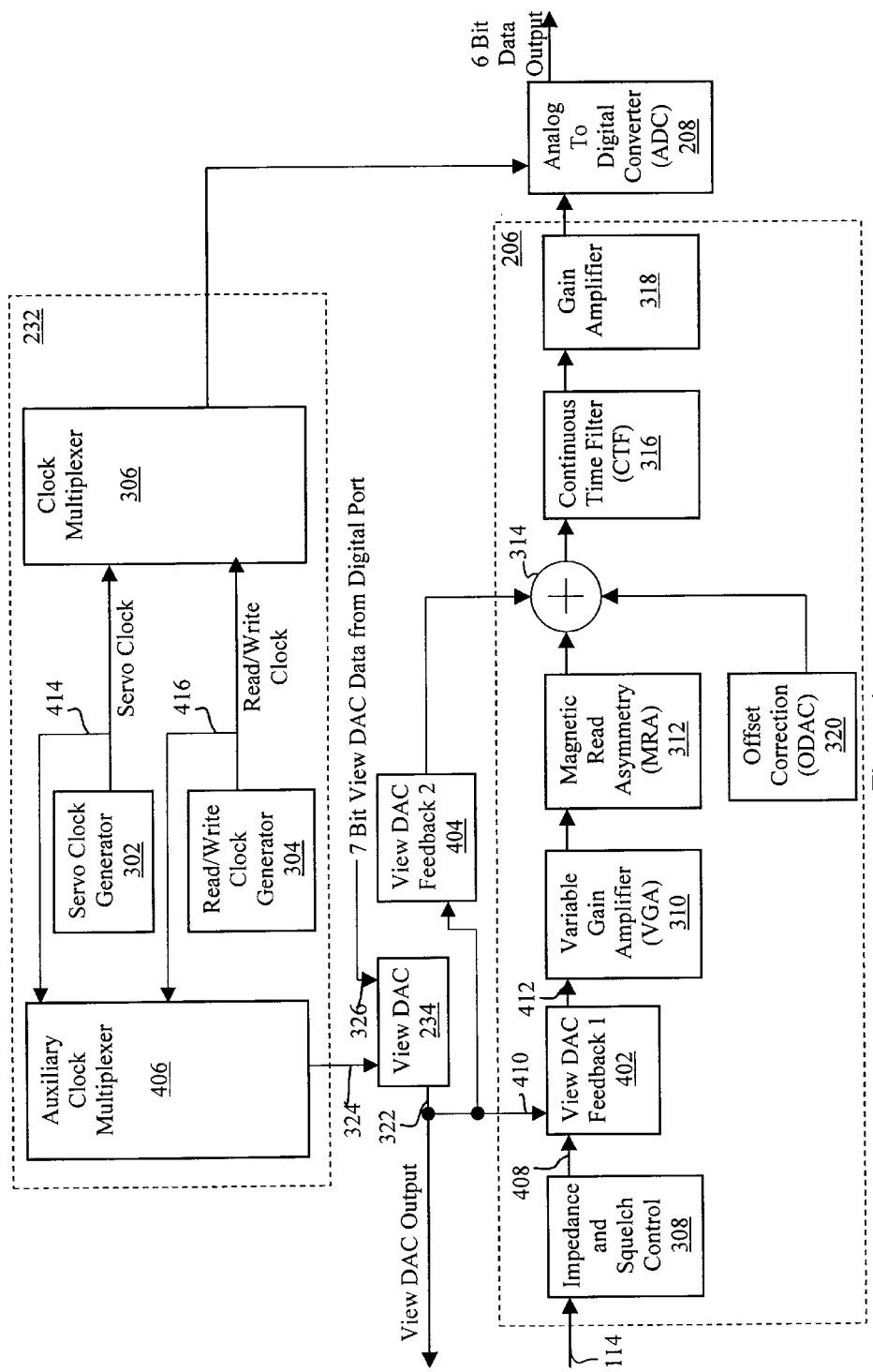
FIG. 4 is a block diagram of is a block diagram of an embodiment for a circuit having a view DAC feedback for an analog front circuit.

Referring now to FIG. 4, an embodiment of an analog front circuit 206 including view DAC feedback circuits 402 and 404 is shown. The analog front circuit 206 includes the impedance and squelch control 308, the VGA 310, the MRA 312 the summing node 314, the continuous time filter 316, the gain amplifier 318, and a first view DAC feedback circuit 402. The first view DAC feed back circuit includes a first input 408, a second input 410, and an output 412. The first input 408 is coupled with the output for the impedance and squelch control circuit 308. The second input 410 is coupled with the view DAC at the view DAC output 232 and the output 412 is coupled with an input for the VGA 310.

The first view DAC feedback circuit 402 selectively couples the output for the impedance and squelch control circuit 308 and the view DAC 234 with the VGA 310. The first view DAC feedback circuit 402 provides a differential voltage output signal associated with the coupled circuits 234 and 402 to the VGA 310 in response to an externally provided control signal. By way of example, the first view DAC feedback circuit 402 couples the view DAC output 232 with the VGA 310 in response to a first view DAC enable signal provided to the first view DAC feedback circuit 402. The coupled view DAC signal is processed by the analog front circuit 206 where it is passed to the ADC 208. The ADC 208 generates a 6-bit digital signal associated with the processed view DAC signal. When the first view DAC enable signal is not provided to the first view DAC feedback circuit 402, the output for the impedance and squelch control circuit 308 is coupled with the VGA 310.

The second view DAC feedback circuit 404 selectively couples the view DAC output 322 with the summing node 314. The second view DAC feedback circuit 404 converts the view DAC output signal to differential current signal. The second view DAC feedback circuit 404 couples the differential current signal with the summing node 314 in response to an externally provided control signal. The differential current signal is combined with the output signal for the MRA 312 and the ODAC 320 at the summing node 314 and passed to the CTF 316. The combined signal is further processed by the analog front circuit 206 and passed to the ADC 208. The ADC generates a 6-bit digital signal associated with the combined signal. The first view DAC feedback circuit 402 and the second view DAC feed back circuit 404 may be configured couple the view DAC feedback circuit 234 exclusively or in combination.

In an embodiment, the clock synthesizer 232 includes an auxiliary clock multiplexer 406. The auxiliary clock multiplexer has a first input 414 coupled with an output for the servo clock generator 302 and a second input 416 coupled with an output for the read/write clock generator 304. The auxiliary clock multiplexer 406 also includes an output coupled with the clock input 324 for the view DAC circuit 234. The auxiliary clock multiplexer 406 is configured to selectively couple the servo clock signal provided at the first input 414 and the read/write clock signal provided at the second input 416 to the clock input 324 of the view DAC circuit 234. The auxiliary clock multiplex selects whether to couple the servo clock or the read/write clock signal to the view DAC input 324 based on externally provided control signals. The auxiliary clock multiplexer 406 permits selection of a clock signal that is provided to the view DAC circuit 234 independently of the clock signal provided to the ADC 208 that is selected by the clock multiplexer 306.

Figure 5:
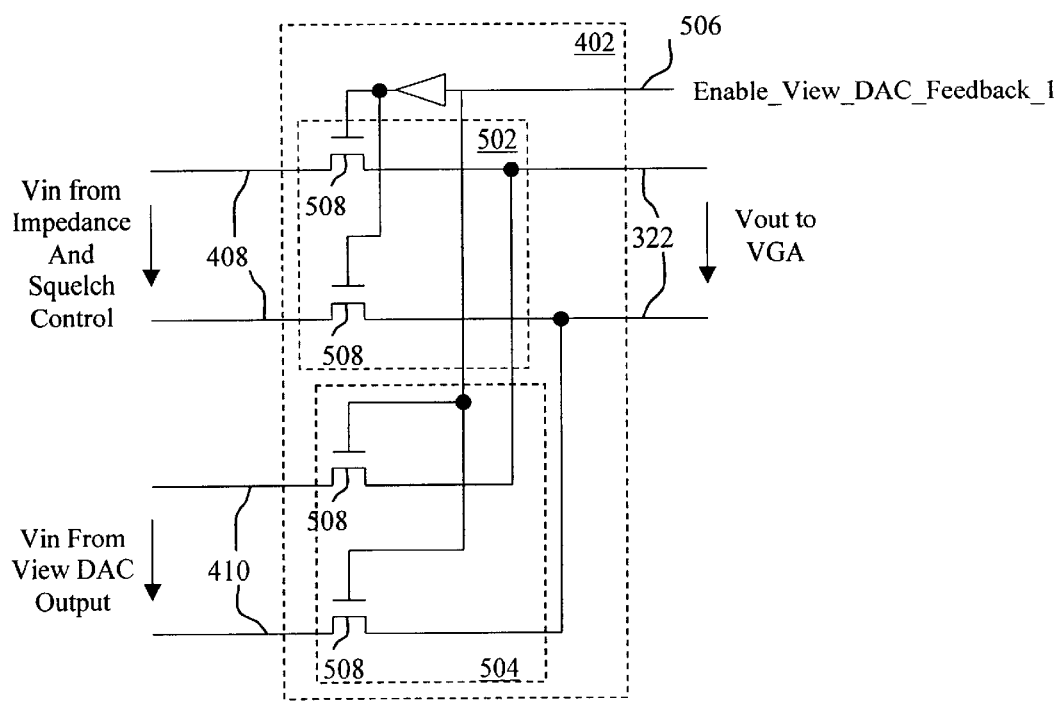
FIG. 5 is a schematic diagram of a circuit for an embodiment of a view DAC feedback circuit.

Referring now to FIG. 5, an embodiment of a first view DAC feed back circuit 402 is shown. The first view DAC feedback circuit 402 includes a first coupling circuit 502 coupled with the first input 408 and a second coupling circuit 504 coupled with the second input 410. The first view DAC feed back circuit 402 includes a control signal input 506 and configured to receive a first view DAC enable signal ("Enable_View DAC_Feedback_1). When the first view DAC enable signal is received at the control signal input 506, the second coupling circuit is switched on and coupling the view DAC output 322 to the VGA 310 at the first view DAC output 412. The first coupling circuit 502 impedes the output from the impedance and squelch control circuit 308 when the first view DAC enable signal is received. Conversely, the first view DAC feed back circuit 402 couples the output from the impedance and squelch control circuit 308 to the VGA 310 when the first view DAC enable signal is not provided at the control signal input 506, and impedes the view DAC output 322.

In an embodiment, the first coupling circuit 402 and the second coupling circuit 504 are configured as a differential switch circuit. Each coupling circuit 502 and 504 includes two NMOS transistors 508 configured as pass transistors. The NMOS transistors 508 for the first coupling circuit 502 are coupled in series with the input 408 and the output 412. The NMOS transistors 508 for the second coupling circuit 504 are coupled in series with the input 410 and the output 412. The pass transistors for the first coupling circuit 502 have a gate that is coupled with the control signal input 506 and configured to receive an inverted control signal. The pass transistors for the second coupling circuit 504 have a gate that is coupled with the control signal input 506 and configured to receive the control signal.

Figure 6:
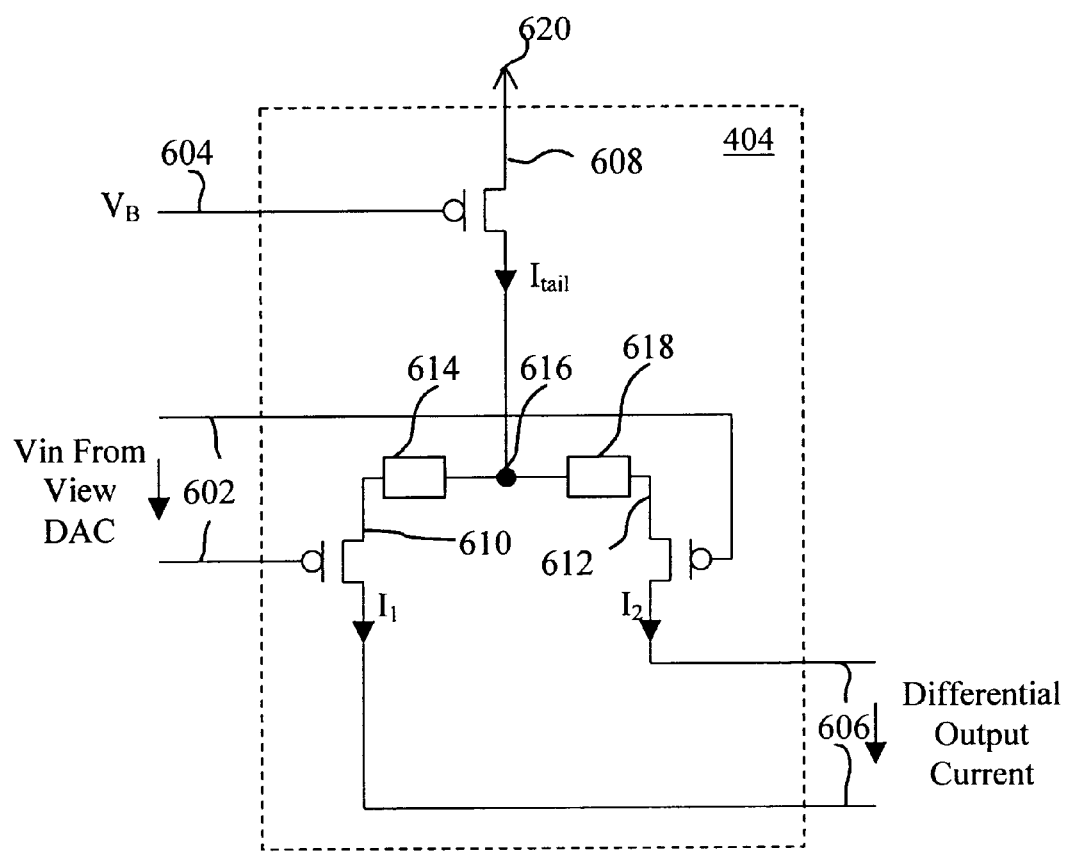
FIG. 6 is a schematic diagram of a feedback circuit for an embodiment of a view DAC feedback circuit.

Referring now to FIG. 6, an embodiment for a second view DAC feed back circuit 404 is shown. The second view DAC feed back circuit 404 has a differential voltage input 602, a control signal input 604, and a differential current output 606. The second view DAC feedback circuit 404 is configured to provide a differential output current at the output 606 based on the differential input voltage provided at the differential voltage input 602. The second view DAC feedback circuit 404 provides the differential current output in response to a control signal provided at the control signal input 604.

In an embodiment, the second view DAC feedback circuit 404 includes a tail current source 608 and a differential transconductance amplifier circuit 620. The tail current source is coupled in series with a positive supply voltage node 620 and a tail current source 616. The tail current is further coupled with the control signal input 604. The tail current source 608 provides a tail current $I_{tail}$ at the tail current node in response to a control signal provided a the control signal input 604. In an embodiment, the tail current source 608 includes at least one PMOS transistor having a source coupled with the positive supply voltage node 620, a drain coupled with the tail current node 616 and a gate coupled with the control signal input 604.

The differential transconductance amplifier circuit 620 is coupled with the tail current node 616, the voltage input 602, and the differential current output 606. The differential transconductance amplifier circuit 620 and is configured to provide a differential output current at the differential current output 606 based on the voltage signal provided at the differential input 602 and the tail current $I_{tail}$ at the tail current node 616. In an embodiment, the differential transconductance amplifier circuit 620 includes a first PMOS transistor 610, a second PMOS transistor 612, a first resistive device 614 and a second resistive device 618. The resistive devices 614 and 618 are each coupled with the tail current node 616. The transistors 610 and 612 each have a drain coupled with the differential current output 606 and a gate coupled with the differential voltage input 602. The first transistor 610 has a source coupled with the first resistive device 614. The second transistor 612 has a source coupled with the second resistive device 618. The resistive devices 614 and 618 have an impedance of 250 Ohms. The differential current provided at the differential output 606 proportional to the tail current $I_{tail}$ provided at the tail current node 616.

Figure 7:
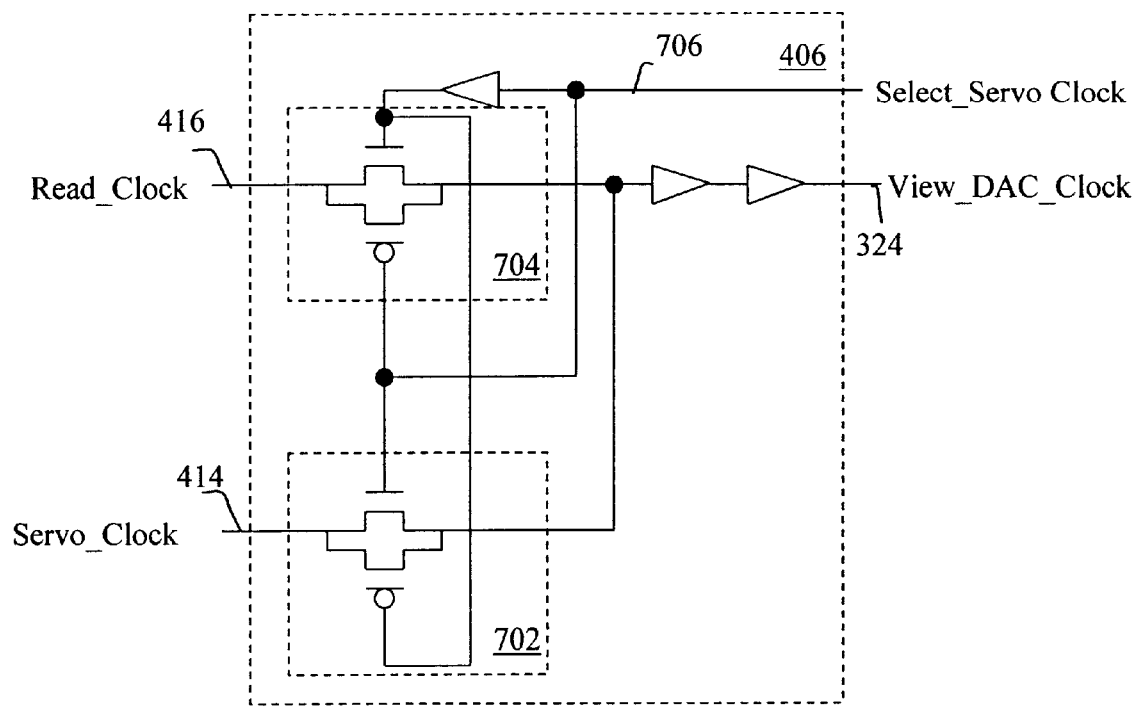
FIG. 7 is a schematic diagram of an auxiliary multiplexer for an embodiment of a view DAC feedback circuit.

Referring now to FIG. 7, an embodiment of an auxiliary clock multiplexer 406 is shown. The auxiliary multiplexer may include a servo clock select circuit 702, a read/write clock select circuit 704, and a control signal input 706. The servo clock select circuit 702 is coupled to the servo clock input 414. The read/write clock select circuit 704 is coupled with the read/write clock input 416. The select circuit 702 and 704 are configured to couple the corresponding clock signal to the view DAC clock input 324 in response to a control signal received at the control signal input 706.

Figure 8:
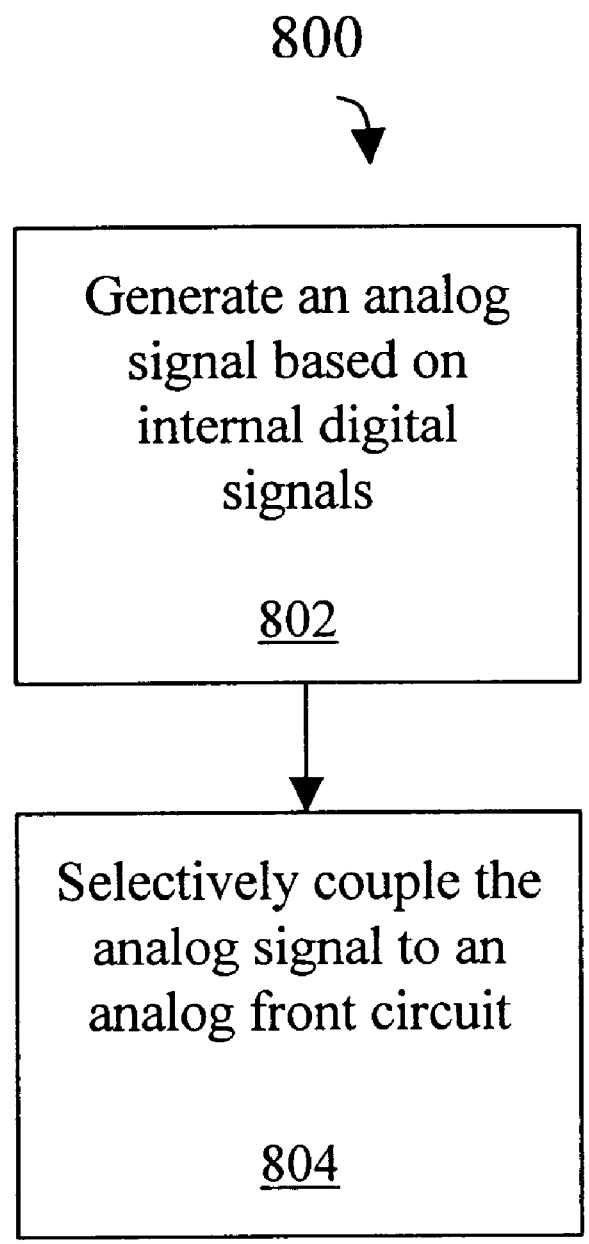
FIG. 8 is a flowchart according to an exemplary method for tuning a read circuit for a PRML based read/write channel.

Referring now to FIG. 8, a flowchart for an embodiment of a method for tuning a read circuit of a PRML based read/write channel is shown. The method includes the acts of generating 802 an analog signal associated with a performance level of the PRML based read channel, and selectively coupling 804 the analog signal to an analog front circuit for a read circuit of the PRML read/write channel. In an embodiment, the analog signal is generated using digital information from an internal digital bus.

The act of generating 802 an analog signal may further include the acts of selecting a digital clock signal from a servo clock generator and a read/write clock generator. The analog signal is generated by converting digital signals to an analog signal. The digital signals include the selected digital clock signal and a 7-bit digital data signal received from an internal digital port for the PRML read/write channel.

In one embodiment, the act of selectively coupling 804 includes coupling the analog signal and a variable gain amplifier component of the read circuit. In another embodiment, the act of selectively coupling 804 the analog signal includes coupling the analog signal to an internal summing node 314. The summing node 314 has a first input coupled with an ODAC circuit for the read circuit, a second input coupled with the MRA circuit of the read circuit, and an output coupled with an input for a CTF.

Various implementations of the view DAC feedback can be realized that are within the scope of the present invention. A view DAC feedback inside an analog front circuit of a PRML based read/write channel can be obtained. All of the components of view DAC feedback circuit may be integrated with the read/write channel on a single integrated circuit semiconductor chip. Alternatively, some or all of the components of the counter circuit may be implemented in one or more integrated circuits external to a read/write channel.

While particular embodiments of the present invention have been shown and described, modifications may be made. It is therefore intended in the appended claims, including all equivalents, cover all such changes and modifications.

What is claimed is:

1. A partial response, maximum likelihood ("PRML") read/write channel, comprising:

an analog front circuit including electronic components configured to process analog information received from a magnetic data storage medium;

a view digital-to-analog converter ("DAC") circuit having a first input coupled with an internal PRML digital port having high-speed digital signals, the view DAC circuit being configured to convert the digital signals to an analog signal associated with the digital signals, the analog signal provided at a view DAC output node; and a view DAC feedback circuit coupled with the view DAC output node and being configured to selectively couple the view DAC output to an input path of the electronics of the analog front circuit during a calibration procedure to optimize performance of the PRML read/write channel.

2. The PRML read/write channel of claim 1, further comprising:

a synthesizer circuit configured to generate clock signals for synchronizing read and write operations for the read/write channel, the clock signals being provided at a auxiliary synthesizer output node; and the view DAC circuit having a second input coupled with the auxiliary synthesizer output node, the view DAC circuit being configured to convert the digital signals and the clock signal to an analog signal associated with the digital signals and the clock signal, the analog signal provided at the view DAC output.

3. The PRML read/write channel of claim 2, wherein the synthesizer comprises:

a servo clock generator configured to provide a servo clock signal that is used to synchronize a read/write head position, the servo clock signal provided at a servo clock output node;

a read/write clock generator configured to provide a read/write clock signal that is used to synchronize data read and write operations for the PRML read write channel, the read/write clock signal provided at a read/write clock output node; and an auxiliary multiplexer coupled with the servo clock generator output and the read/write clock generator, the auxiliary multiplexer configured to selectively couple the servo clock signal and the read/write signal at the auxiliary synthesizer output.

4. The PRML read/write channel of claim 3, wherein the analog front circuit includes a variable gain amplifier having an input coupled with the view DAC feedback circuit, the view DAC feedback circuit being operative to selectively couple the view DAC output with the variable gain amplifier.

5. The PRML read/write channel of claim 4, wherein the analog front circuit includes an impedance and squelch control circuit having an input coupled with the view DAC feedback circuit, the view DAC feedback circuit being configured to selectively couple the impedance and squelch control circuit with the variable gain amplifier circuit.

6. The PRML read/write channel of claim 5, wherein the view DAC feedback circuit comprises a first coupling circuit and a second coupling circuit, the first coupling circuit being coupled with an output for the impedance and squelch control circuit and the second coupling circuit being coupled with the view DAC output, the first coupling circuit and the second coupling circuit being configured as a differential switch circuit to selectively switch the impedance and squelch control circuit and the view DAC with the variable gain amplifier circuit.

7. The PRML read/write channel of claim 3, comprising:
   a summing node coupled with an input for a continuous time filter;
   a magnetic read asymmetry circuit having an output coupled with the summing node, the magnetic read asymmetry circuit being operative to correct distortion in an analog signal;
   an offset correction circuit having an output coupled with the summing node, the offset correction configured to cancel offset in the analog information; and
   the view DAC feedback circuit having an output coupled with the summing node, the view DAC feedback circuit being configured to selectively couple the view DAC output with the summing node.

8. The PRML read/write channel of claim 7, wherein the view DAC feedback circuit comprises:
   a tail current source operative to provide a tail current at a tail current node; and
   a differential transconductance amplifier circuit coupled with the tail current node and being operative to switch the tail current to a differential output.

9. The PRML read/write channel of claim 8, wherein the differential transconductance amplifier comprises:
   a first resistive device coupled with the tail current node;
   a second resistive device coupled with the tail current node;
   a first transistor having a source coupled with the first resistive device, a drain coupled with a differential current output, and a gate coupled with a differential voltage input; and
   a second transistor having a source coupled with the second resistive device, a drain coupled with a differential current output, and a gate coupled with a differential voltage input.

10. The PRML read/write channel of claim 9, wherein the first transistor and the second transistor each comprise a PMOS transistor.

11. An integrated tuning circuit for a PRML read/write channel, the integrated calibration circuit comprising:
   an analog front circuit having prearranged electronic components configured to process analog information received from a magnetic data storage medium, the electronics components including an impedance and squelch control component, a variable gain amplifier component, a magnetic read asymmetry component; an offset correction component and a continuous time filter component;
   a view DAC circuit operative to receive a 7-bit digital data from an internal digital bus of the PRML read/write channel and a clock signal from a synthesizer circuit, the view DAC being operative to convert the 7-bit digital data and the clock signal to an analog signal provided at a view DAC output, the analog signal associated with a performance level for the PRML read/write channel;
   a first view DAC feed back circuit having a first input coupled with the view DAC output, a second input coupled with the impedance and squelch control circuit and an output coupled with the variable gain amplifier component, the first view DAC feedback operative to selectively couple the impedance and squelch control component and the view DAC output to the variable gain amplifier; and
   a second view DAC feedback circuit having an input coupled with the view DAC output and an output coupled with a summing node, the second view DAC feedback circuit being operative to selectively couple the view DAC circuit with the summing node, the summing node being coupled with an output of the magnetic read asymmetry component and with an output of the offset correction component and providing an input to the continuous time filter component.

12. The integrated tuning circuit of claim 11, comprising an auxiliary multiplexer circuit coupled with the synthesizer circuit and being operative to selectively couple a clock signal with the view DAC circuit.

13. The integrated tuning circuit of claim 12, wherein the synthesizer circuit comprises a servo clock generator and a read/write clock generator, and the auxiliary multiplexer is operative to selectively couple the servo clock generator and the read/write generator with the view DAC circuit.

14. The integrated tuning circuit claim 13, wherein first feedback comprises:
   a first differential voltage input being coupled with an output of the impedance and squelch control component;
   a second differential voltage input being coupled with the view DAC output; and
   a differential voltage output coupled with an input of the variable gain amplifier;
   wherein the first feed back circuit is operative to selectively couple the first differential input and the second differential input to the differential output in response to an externally provided control signal.

15. The integrated tuning circuit of claim 14, wherein the second feedback circuit comprises:
   a tail current source operative to provide a tail current at a tail current node; and
   a differential transconductance amplifier circuit coupled with the tail current node and being operative to switch the tail current to a differential output.

16. The integrated tuning circuit of claim 15, wherein the differential transconductance amplifier comprises:
   a first resistive device coupled with the tail current node;
   a second resistive device coupled with the tail current node;
   a first transistor having a source coupled with the first resistive device, a drain coupled with a differential current output, and a gate coupled with a differential voltage input; and a second transistor having a source coupled with the second resistive device, a drain coupled with a differential current output, and a gate coupled with a differential voltage input.

17. A method of tuning a PRML based read/write channel, the method comprising the acts of:

generating an analog signal associated with a performance level of the PRML based read channel, the analog signal being generated from digital information from an internal digital bus; and selectively coupling the analog signal to an input path of the electronics of an analog front circuit for a read component of the PRML read/write channel.

18. The method of tuning a PRML based read/write channel of claim 17, wherein the act of generating an analog signal comprises:

selecting a digital clock signal, the clock signal being selected from a servo clock signal and a read/write clock signal; and converting the selected digital clock signal and a 7-bit digital data signal received from an internal digital port for the PRML read/write channel to the analog associated with a performance level of the PRML based read/write channel.

19. The method of tuning a PRML based read/write channel of claim 18, wherein the act of selectively coupling the analog signal comprises coupling the analog signal and a variable gain amplifier component of the read circuit.

20. The method of tuning a PRML based read/write channel of claim 18, wherein the act of selectively coupling the analog signal further comprises coupling the analog signal to an internal summing node having a first input coupled with an offset correction component of the read circuit, a second input coupled with a magnetic read asymmetry component of the read circuit and an output coupled with an input for a continuous time filter.

21. A hard disk drive, comprising:

a magnetic storage medium having at least one platter configured to store data as magnetic flux;

a head operative to read data from and write data to the magnetic storage medium, the head providing an analog data signal at a head output;

a PRML based read/write channel coupled with the head output and operative to receive and process the analog data signal provided by the head, the PRML based read/write channel having a read circuit with an analog front circuit;

a view DAC circuit coupled with the PRML based read/write channel and operative to generate an analog signal from a digital clock signal and internal digital signals at an internal 7-bit digital port of the PRML read/write channel, the analog signal associated with a performance level for the PRML based read/write channel and being provided at a view DAC output; and a view DAC feedback circuit coupled with the view DAC output and being operative to selectively couple the view DAC output with an input path of the electronics of the analog front circuit.

22. The hard disk drive of claim 21, wherein the analog front circuit includes a variable gain amplifier having an input coupled with the view DAC feedback circuit, the view DAC feedback circuit being operative to selectively couple the view DAC output with the variable gain amplifier.

23. The hard disk drive of claim 22, wherein the analog front circuit includes an impedance and squelch control circuit having an input coupled with the view DAC feedback circuit, the view DAC feedback circuit being configured to selectively couple the impedance and squelch control circuit with the variable gain amplifier circuit.

* * * * *